Figure 3:
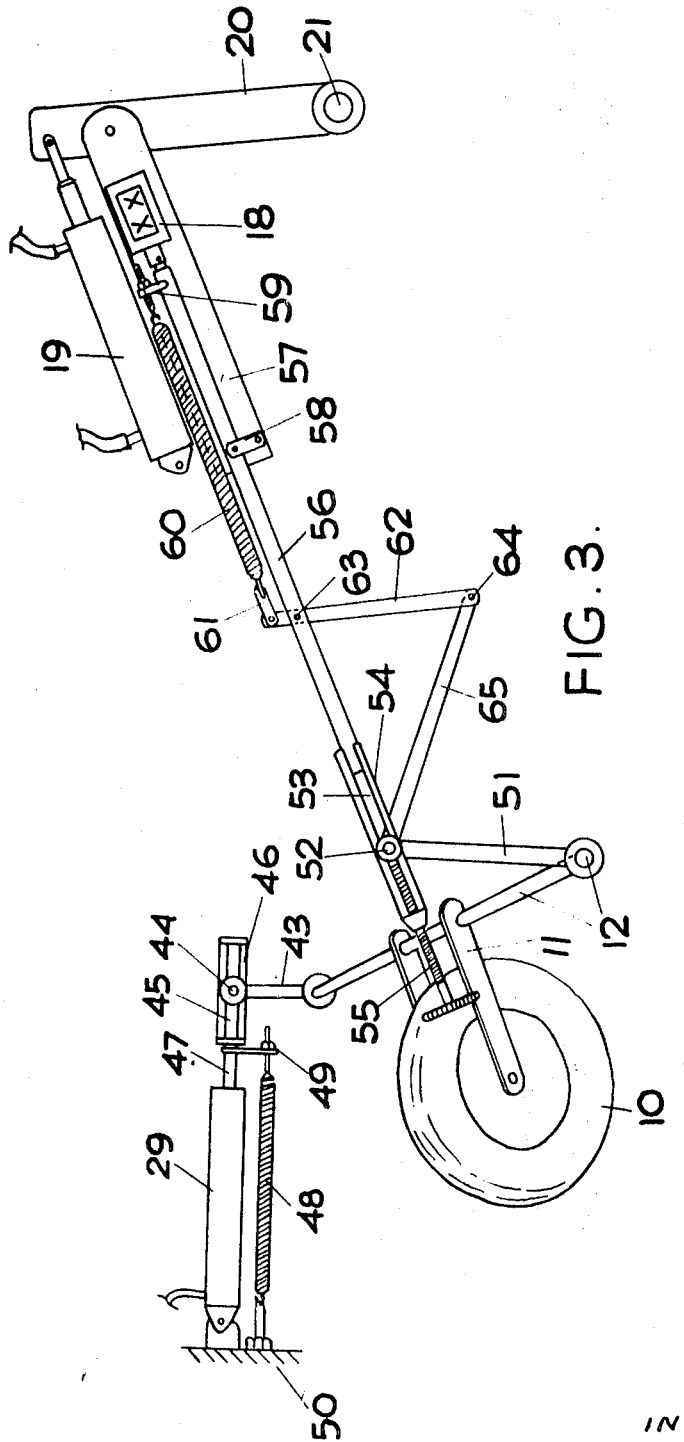

United States Patent

[11] 3,603,404

| [72] | Inventor | William John Whitsed<br>Peterborough, England |
|---|---|---|
| [21] | Appl. No. | 37,827 |
| [22] | Filed | May 15, 1970 |
| [45] | Patented | Sept. 7, 1971 |
| [73] | Assignee | Root Harvesters Limited<br>Peterborough, England<br>Continuation of application Ser. No.<br>677,536, Oct. 24, 1967, now abandoned. |

[54] HARVESTERS FOR ROOTS, TUBERS AND THE LIKE
9 Claims, 3 Drawing Figs.

[52] U.S. Cl.................................................... 171/9,
56/121.46
[51] Int. Cl...................................................... A01d 21/02
[50] Field of Search......................................... 171/9, 140;
56/121.4, 121.46

[56] References Cited
UNITED STATES PATENTS

| 1,977,523 | 10/1934 | Morkovski................. | 171/140 |
| 2,641,892 | 6/1953 | Hojio......................... | 56/121.46 |
| 2,755,614 | 7/1956 | Sishc......................... | 56/121.46 |

*Primary Examiner*—A. F. Guida
*Attorney*—Ulle C. Linton

ABSTRACT: Control means for the digging blade of a root crop harvester comprising means for raising and lowering the digging blade in relation to the harvester frame, a feeler device movable up and down to engage the soil surface and sense the level thereof, a fluid pressure operated device for raising and lowering the blade and valve means associated with the fluid pressure operated device actuated in one sense by the up and down movements of the feeler device and in an opposite sense by up and down adjusting movements of the digging blade whereby the blade is maintained at a desired depth of penetration of the soil.

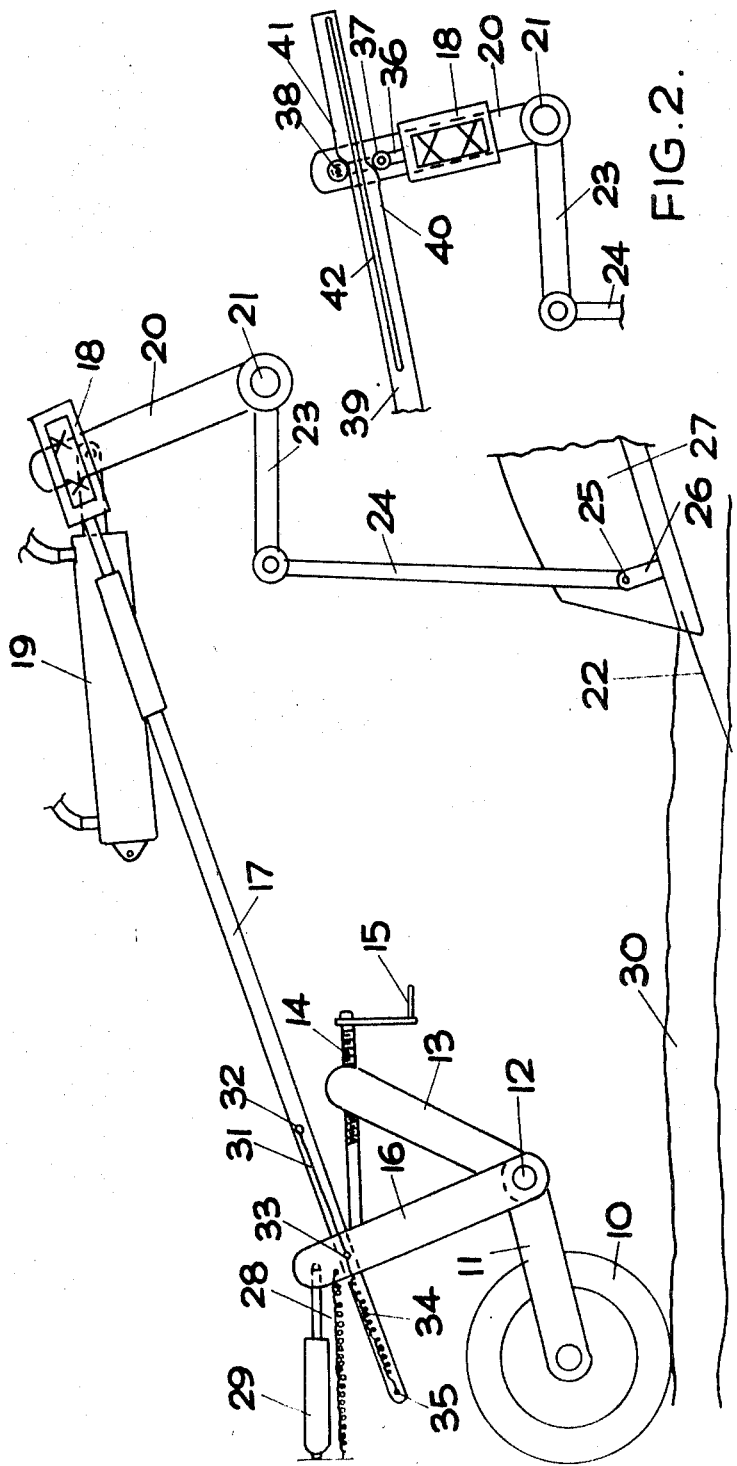

HARVESTERS FOR ROOTS, TUBERS AND THE LIKE

This Application is a continuation of my U.S. Pat. Application Ser. No. 677536, filed Oct. 24th 1967, now abandoned, and the invention is for improvements in harvesters for roots, tubers and the like.

Such harvesters are ordinarily provided with a digging blade or share by which the crop to be harvested is raised from the ground together with surrounding soil and other foreign matter, and it is a matter of some difficulty to provide a satisfactory control of the depth at which the digging blade operates under varying conditions. Thus in some circumstances the digging blade may tend to operate too deeply and give rise to an excessive intake of soil and other foreign matter, while in other circumstances the digging blade may tend to rise and cut or damage the roots or tubers. The invention seeks to provide depth control means whereby the digging blade is controlled in, or closely approximating to, a required manner under varying soil conditions to maintain it at the required depth.

In practicing the invention there is provided control means for the digging blade of a harvester for root crops comprising means for raising and lowering the digging blade in relation to the harvester frame, a feeler device movable up-and-down to engage the soil surface, a fluid pressure operated device for raising and lowering the blade and valve means associated with the fluid pressure operated device actuated by the up-and-down movements of the feeler device. The feeler device is conveniently adapted to engage the top of a ridge in which the root crops are grown and by its position heightwise in relation to the harvester frame it is thus arranged to control the level at which the digging blade operates.

The fluid pressure operated device acting on the digging blade is double-acting and is controlled by a double-acting control valve the setting of which is varied by up-and-down movements of the feeler device and also in an opposite sense by adjustment movements of the digging blade. The feeler device may take the form of a freely rotatable wheel on a pivoted arm. The double-acting control valve is interconnected between a pivoted arm which moves with the up and down adjusting movements of the digging blade, and a link connected to an arm operated by the feeler device for operation by relative movement between said pivoted arm and link. Thereby a control of the level of the digging blade can be effected with a required degree of sensitivity since movement of the feeler device up or down from a position in which the control arrangement is in equilibrium will cause appropriate operation of the control valve in the appropriate one of two directions from a neutral setting to energize the fluid pressure operated device to raise or lower the digging blade to the required extent to bring the control arrangement back into a state of equilibrium at which the digging blade will have been raised or lowered to an extent to maintain its depth in the soil substantially uniform. Due to the sensitivity of this arrangement the pressure of the feeler device on the soil surface need only be quite small and insufficient to sink into or consolidate the soil to an undesired extent. The light pressure of the feeler device on the soil is conveniently secured by a spring, e.g. a tension spring, acting on an arm connected to the arm carrying the feeler device, or directly to the latter arm.

Examples of control arrangements in accordance with the invention are illustrated diagrammatically in the accompanying drawings, in which, FIG. 1 is a diagrammatic side elevation of a control means for the digging blade of a harvester for root crops:

FIG. 2 is a detailed view corresponding to a part of FIG. 1 showing a modification, and FIG. 3 is a diagrammatic side elevation view, with certain parts shown in slant perspective for clearance of illustration, showing a further alternative arrangement.

In the construction shown in FIG. 1 the feeler device is a wheel 10 on an arm 11 secured to a spindle 12 mounted in bearings fixed to the frame of the harvester vehicle (not shown). To the spindle 12 there is also fixed an arm 13 carrying a screw threaded adjustable rod 14 fitted with a winding handle 15 and engaging in a nut on arm 13. The screwed rod 14 is connected at its left-hand end to an arm 16 freely mounted on spindle 12. The rod 14 serves to effect initial adjustment by variation of the angle between the arms 13 and 16. Connected to the outer end of arm 16 is a kink 17 which extends from the arm to a double-acting control valve 18 (operable in opposite directions from a neutral setting) associated with a double-acting fluid pressure (for example hydraulic) operated ram 19 the casing of which is anchored to a fixed part of the frame of the harvester vehicle and the operating plunger of which is fixed to an arm 20 pivoted at 21 on which the control valve 18 is mounted. Movement of the arm 20 not only moves the casing of valve 18 but also raises and lowers the digging blade indicated at 22 through an arm 23 fixed to arm 20 and link rod 24 anchored at 25 to a bracket 26 on the blade holder 27 which is pivoted to a fixed part of the harvester vehicle frame.

The arm 16 is acted on by a tension spring 28 to urge feeler wheel 10 lightly against the top of ridge 30 the soil in which is to be raised together with the roots or tubers grown therein, without pressing unduly against the top surface of the ridge. The arm 16 is also connected to a fluid pressure operated piston and cylinder device 29 by which it can be operated to lift the feeler wheel 10 away from the ground when required.

The arm 16 is coupled to the link 17 by a yieldable connection comprising a wire cable 31 and tension spring 34. The cable 31 is anchored at 32 to the line 17 and at 33 to the arm 16 and the tension spring 34 is anchored at 35 to the link 17 and at 33 to the arm 16.

When the harvester vehicle is in use raising and lowering of the feeler wheel 10 has the effect of yieldably operating the link 17 to adjust the setting of double-acting acting control valve 18 to cause the ram 19 to rock lever 20 in the appropriate direction to raise or lower the digging blade 22. When the blade has been raised or lowered to the required extent the valve 18 is returned by movement of arm 20 to a neutral setting at which no further movement takes place. It will thus be seen that any rise or fall in the level of the wheel 10 on ridge 30 will have the effect through control valve 18 of providing for continuous adjustment of depth of the digging blade to maintain a uniform depth relatively to the top of the ridge 30. Similarly by operation of the fluid pressure operated device 29 the arm 16 can be moved to raise the feeler wheel 10 away from the ground and this movement will operate through control valve 18 to cause the digging blade 22 to be also similarly raised.

The flexible and resilient action provided at 31, 32, 33, 34 and 35 provides a means of protection from damage. Should the wheel ride over a large stone causing it to rise and fall sharply the tension spring 34 will take the shock thereby preventing damage to the control valve 18.

In the alternative arrangement shown diagrammatically in FIG. 2 of the drawings, the control valve 18 is positioned on the lever 20 to extend longitudinally thereof and has a plunger rod 36 carrying cam follower rollers 37 and 38 engaging on opposite sides of a cam bar 39. The latter is secured to or forms part of the link 17 so as to be moved to and fro endwise with up and down movements of the feeler wheel 10, and has formed on its opposite sides cam rises 40 and 41 spaced slightly endwise from one another. The cam bar 39 is provided with a guide strip 42 on one of each side to engage in a stationary guide member. Thus when the feeler wheel 10 moves so as to cause the cam bar 39 to slide either way from the neutral setting shown the plunger rod 36 is moved to energize the ram 19 appropriately to raise or lower the digging blade 22 as required, by rocking lever 20 and arm 23 until the rollers 37 and 38 again reach their neutral position between cam rises 40 and 41.

The modified arrangement illustrated in FIG. 3 has modified connections between the feeler wheel spindle 12 and the fluid pressure operated device 29 for raising the operative parts out of action and also modified connections between the spindle 12 and the arm 20. In this case the spindle 12 is coupled at one end by a link arm 43 to a rod or pin 44 slidable in the slot 45 of a slotted gate 46 secured to the piston rod 47 of the fluid pressure operated device 29. The latter is single acting as in the previous construction and has a return spring 48 connected between a projection 49 on the piston rod and a fixed part 50 to which the body of the device 29 is anchored. The slotted gate 46 allows the feeler wheel 10 to float freely on the ground without influence from the fluid pressure operated device 29 except when it is required to raise the wheel 10 out of action in which case the device 29 is energized to move the slotted gate 46 to the right as seen in FIG. 3.

The connection between the spindle 12 and the arm 20 is obtained through a separate lever arm 51 upstanding from the spindle and having a stud or pin 52 slidable in the slot 53 of a slotted gate 54. An adjusting screw 55 for depth control is screwed into the left-hand end of the gate 54 and forms an adjustable stop at one end of the slot 53. The gate 54 is secured to the left-hand end of a link 56 corresponding to the link 17 of FIG. 1 and connected at its right-hand end to the double-acting control valve 18 which in this construction is mounted on a lever arm 57 anchored to the lever 20, instead of being anchored directly to lever 20 as in FIG. 1. The link 56 is slidable in a guide 58 on the arm 57 and has towards its right-hand end a projection 59 to which is anchored a tension spring 60 the other end of which is anchored at 61 to a lever 62 pivoted at 63 to link 56 and coupled at its opposite end at 64 to a link 65 extending to the stud or pin 52. Thus the effect of spring 60 is to urge the stud or pin 52 against the stop screw 55 at the left-hand end of gate slot 53, thereby urging the feeler 10 towards the ground. It will be evident that the adjustment of depth control screw 55 varies the relative setting between the feeler wheel 10 and the digging blade (22 in FIG. 1) to adjust the level to which the blade is set by engagement of the feeler wheel 10 with the ground. The spring 60 and associated linkage provides a safeguard against damage of any of the parts in the event of a rapid up and down movement of the feeler wheel 10, for example if the latter encounters a large solid object causing it to rise and fall sharply or if the fluid pressure operated device 29 is actuated from the tractor or towing vehicle when there is no flow of fluid for the double acting ram 19, in which event the stud or pin 52 will ride up the gate slot 53 and stretch the spring 60 without forcing the linkage 56 positively with it.

It will be appreciated that other methods of safeguard against damage besides those illustrated may be employed to suit particular circumstances.

What I claim is:

1. Control means for the digging blade of a harvester for digging root crops from the soil comprising in combination a heightwise adjustable digging blade, means comprising a pivoted arm for raising and lowering the digging blade in relation to the harvester, a double acting fluid pressure operated device operatively connected to said pivoted arm of the blade raising and lowering means, a feeler device for engaging the soil, a feeler operated arm connected to said feeler device for being pivoted thereby, a link extending from said feeler operated arm, a yieldable connection between said feeler operated arm and said link, means for adjusting the setting of said link relatively to said feeler, control means operatively connected to said double-acting fluid pressure operated device and including a double-acting control valve operable in opposite directions from a neutral setting for energizing said double-acting fluid pressure operated device for movement in opposite ways, and means interconnecting said double-acting control valve between said pivoted arm of the blade raising and lowering means and said link for operation by relative movement between them.

2. Control means as claimed in claim 1 wherein said yieldable connection comprises a wire cable and a spring attached to said link at positions spaced apart thereon, a connection joining said wire cable to said spring and means coupling said connection to said feeler operated arm.

3. Control means as claimed in claim 1 wherein said yieldable connection comprises a slotted gate secured to said link, a stud slidable in said slotted gate and having said feeler operated arm pivotally connected thereto, a lever pivotally connected to said link, a second link coupling said lever to said stud, and a spring connecting said lever and said first link.

4. Control means as claimed in claim 3 including means on said slotted gate for adjusting the position of said stud therein.

5. Control means as claimed in claim 1 including second fluid pressure operated device coupled to said feeler device for raising it away from the soil.

6. Control means as claimed in claim 1 including a second feeler operated arm connected to said feeler device for being pivoted thereby about the pivotal axis of the first said feeler operated arm, a rotatable screw threaded rod anchored to one of said feeler operated arms, and a nut on the other of said feeler operated arms in threaded engagement with said rod.

7. Control means as claimed in claim 1 wherein said double-acting control valve is mounted longitudinally of said pivoted arm of the blade raising and lowering means and has a plunger rod, and rollers mounted on said plunger rod, and a cam bar engaging with said rollers is provided on the said link.

8. Control means as claimed in claim 1 including a lever arm pivotally connected to said pivoted arm of the blade raising and lowering means, and having said double-acting control valve mounted on said lever arm and the said link slideable on said lever arm, and having a guide provided on said lever arm for guiding said link.

9. Control means as claimed in claim 5 wherein said second fluid pressure operated device has a piston rod, a slotted gate is attached to said piston rod, a pin is slideable in said slotted gate, and a link arm is connected to said feeler device for being pivoted thereby and carries said pin.